United States Patent [19]

Jäger

[11] Patent Number: 4,564,442
[45] Date of Patent: Jan. 14, 1986

[54] OPERATING PROCEDURE AND SIFTER FOR THE SIFTING OF CEMENT

[76] Inventor: Heinz Jäger, Nevelstrasse 40, 4630 Bochum 1, Fed. Rep. of Germany

[21] Appl. No.: 738,500

[22] Filed: May 28, 1985

Related U.S. Application Data

[63] Continuation of Ser. No. 546,888, Oct. 31, 1983, abandoned.

[30] Foreign Application Priority Data

Nov. 4, 1982 [DE] Fed. Rep. of Germany ....... 3240793

[51] Int. Cl.$^4$ ................................................. B07B 9/02
[52] U.S. Cl. ..................................... 209/148; 209/144
[58] Field of Search .................... 209/139 R, 144, 148

[56] References Cited

U.S. PATENT DOCUMENTS 4,292,172 9/1981 Hosokawa et al. ................. 209/144

Primary Examiner—Charles Hart
Attorney, Agent, or Firm—Herbert L. Lerner; Laurence A. Greenberg

[57] ABSTRACT

Operating procedure for the operation of a circulating-air sifter, particularly a cyclone circulating-air sifter for sifting cement, characterized by the feature that the circulating air stream is divided into a primary sifting-air stream and a secondary air stream.

16 Claims, 2 Drawing Figures

OPERATING PROCEDURE AND SIFTER FOR THE SIFTING OF CEMENT

This application is a continuation of application Ser. No. 546,888 filed Oct. 31, 1983 now abandoned.

BACKGROUND OF THE INVENTION

1. Field of the Invention

The invention relates to an operating procedure for operating a recirculating-air sifter, particularly a cyclone circulating-air sifter for sifting cement, as well as a circulating-air sifter for carrying out the operating procedure.

2. Description of the Prior Art

In a recirculating-air sifter for sifting cement, the material to be sifted is customarily charged-in centrally from above and is distributed uniformly in a rising sifting-air stream by means of a spreading disc arranged in the shifting space. The coarse material from the sifting-air stream is precipitated into the housing part arranged underneath and finally leaves the sifter through a discharge stub at the lower part of the housing. The fine material in the sifting-air stream at the upper edge of the upper housing part is fed via an air discharge head to individual separating cyclones which are customarily arranged around the sifter in ring fashion. There, the separation of the fine material from the sifting air takes place, the sifting air being returned into the sifter via a manifold and a blower disposed on the outside. The uniform distribution of the sifting air over the sifting space entrance area is accomplished by means of guide vanes which are arranged in ring fashion in the central part of the housing. The separated fine material in the separator cyclones is discharged via pendulum flaps. A sifter described above is known, and disclosed for instance in German Pat. No. 1 178 284.

In the known recirculating-air sifters of the design described above, the amount of recirculating air must be reduced substantially and the speed of rotation of the scattering disc increased, when changing, for instance, from a coarser to a finer sifting product. This reduction of the amount of circulating air lead to deposits of material in the feed ducts from the sifter to the separating cyclone because the flow velocities are too low. In addition, the degree of separation in the separating cyclone is affected adversely by the lower supply of air. Due to the reduction of the amount of circulating air, a possible supply of fresh air for cooling the product must additionally be reduced so that an unfavorably high operating temperature results.

SUMMARY OF THE INVENTION

An object of the invention is to provide a recirculating-air system and in particular a cyclone circulating-air system, in which the disadvantages above are avoided. The cyclone circulating-air sifter in accordance with the invention is to operate with respect to the separating cyclones always with such amount of circulating air which will avoid deposits in the feed ducts from the sifter to the cyclones and will maintain a high degree of separation in the cyclone. In addition, a sufficient amount of fresh air will always be available for cooling the finished product.

Another object of the invention is to provide a cyclone circulating-air sifter having an overall height which is substantially reduced from the heights known heretofore, so that it can be manufactured less expensively and be built into smaller buildings. Thus, the cost of the building can also be reduced.

With the foregoing and other objects in view, there is provided in accordance with the invention a method for operating a circulating-air sifter, particularly a cyclone circulating-air sifter for sifting cement, wherein the material to be sifted is distributed in a rising sifting air-stream which separates the fine material from the material to be sifted by entraining the fine material in the rising sifting air-stream with the coarse material not entrained by the sifting air-stream precipitating into the sifter and discharged therefrom, wherein the entrained fine material is separated from the air-stream and the air-stream recirculated to the sifter for further sifting of material, the improvement comprising dividing the circulating air-stream into a primary air-stream and a secondary air stream.

In accordance with the invention, there is provided a recirculating-air sifter for sifting material by means of a rising sifting air-stream to separate fine material from coarse material comprising a sifter having an upper annular part, a central sifting space, a lower inverted conical part with an opening at the bottom for coarse material discharge, said central sifting space having a centrifugal system with attached blades and a rotating spreading disc, a charging tube open at the top of the sifter for the charge-in of material to be sifted, and leads to the spreading disc which distributes the charge, a plurality of external cyclone separators ring the sifter, connection ducts for passage of air containing entrained fine material connecting the sifter to the external cyclone separators in which the fine material is separated from the air, and a recirculating-air return line which opens into the upper annular part of the sifter for the return of the separated air from the external cyclone separators.

Other features which are considered as characteristic for the invention are set forth in the appended claims.

Although the invention is illustrated and described herein as embodied in an operating procedure and sifter for the sifting of cement, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
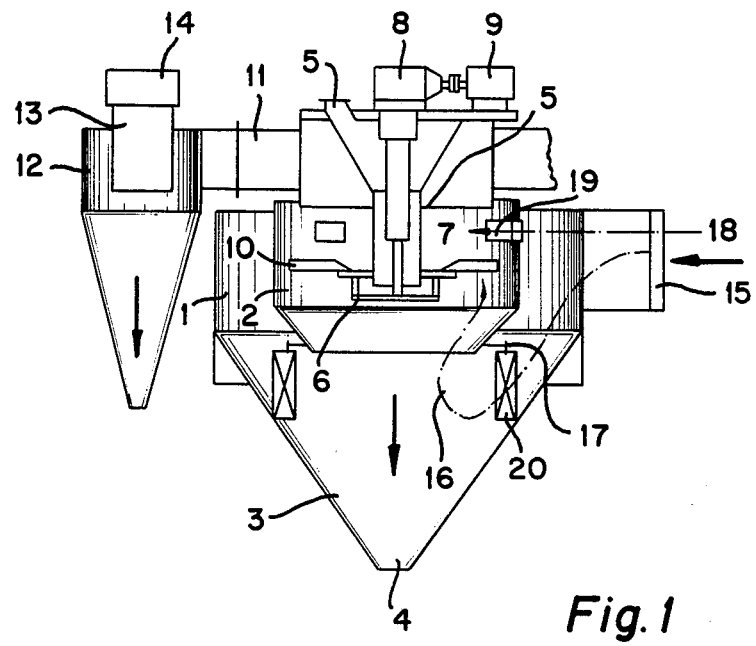
FIG. 1 shows a schematic section through the cyclone circulating-air sifter according to the invention.

The invention relates to an operating procedure for operating a recirculating air sifter, particularly a cyclone circulating-air sifter as well as a cyclone circulating-air sifter for sifting cement, where the recirculating air stream is divided into a primary sifting air stream and a secondary air stream. The primary air stream and secondary air stream are introduced together into the upper part of the sifter, where the primary sifting-air stream is deflected and transferred to the lower part of the sifter. The individual air streams can be controlled as to the direction of the entry and the velocity.

In accordance with the invention, the recirculating-air stream is divided into a primary sifting-air stream and a secondary air stream. By means of the division of the recirculating air stream according to the invention into a primary sifting-air stream and a secondary air stream, advantageously, the amount of circulating air can always be kept constant so that good operating conditions are always obtained for the separating cyclones and their input lines. The ability to change the ratio of primary sifting-air stream and secondary air stream, permits the primary sifting-air stream to be adapted by simple means to the necessary flow conditions in the sifting space. Thus, even an optimum sifting-air velocity relative to the grain size of the material to be sifted can be simply adjusted in this manner at any time.

In a further embodiment of the invention, the primary sifting-air stream and the secondary air stream may be introduced into the upper part of the sifter. This facilitates the desired low overall height of the cyclone circulating-air sifter and also provides the potential for separating the primary sifting-air stream and the secondary air stream within the sifter. The result is a simple design which provides the basis for an inexpensive manufacture of the cyclone circulating-air sifter. Furthermore, the division of the primary sifting-air stream and the secondary air stream can be accomplished by the sifting space wall itself, in which only simple, controllable passages for the secondary air stream need be provided.

The primary sifting-air stream may be deflected after entering the upper part of the sifter and transferred into the lower part of the sifter. Thus, the desired simple design is obtained by a division of the primary sifting-air stream and the secondary air stream within the sifter with very short flow paths. Advantageously, th secondary air stream is passed-on tangentially into the interior of the sifter and aids the flow of the primary sifting-air stream.

The individual air streams can be controlled as to direction of entry and velocity. Thus, the matching of the two air streams for carrying out the operating procedure can be accomplished and the entry direction of the primary sifting-air stream can be controlled. Such matching of the air streams and control of the entry direction of the primary air stream not only improves the result of the sifting, but also aids the motion of the centrifugal system, which leads to power savings in the drive of the centrifugal system. The direction and strength of the secondary air stream can be adjusted so that it aids the motion of the primary sifting air stream.

The share of the amount of secondary air in the return amount of circulating air is between 5 and 65%. Thus, the desired good matching of the primary sifting-air stream to the requirements of different charging grain sizes is obtained while maintaining a minimum secondary air stream for generating an always constant discharge vortex in the sifter head.

A recirculating-air sifter with an inner sifting space, external cyclone separators and a circulating-air return line is provided for implementing the operating procedure, in which procedure the circulating-air return of the separating cyclones opens into the upper part of the sifter preferably tangentially. Thus, the desired low overall height is obtained (because the central part of the sifter can be eliminated), together with an extremely simple and inexpensive design of the sifter with short air paths and small internals. The subdivision of the amount of circulating air into a primary sifting air stream and a secondary air stream is particularly simple and is accomplished only in the sifter itself by the wall of the sifting space.

In a further embodiment of the invention, the sifter has an annular primary sifting-air transfer space from the circulating-air return line to the sifting space. Thus, in a particularly simple manner, the primary sifting-air stream can be transferred into the lower part of the sifter and, at the same time, distributed so that a good sifting effect is obtained through all flow velocities. This results in further simplification of the design of the sifter.

The sifter may be provided with adjustable guide vanes for the primary sifting-air stream and tangentially oriented nozzles for the secondary air stream. The secondary air stream has throttling organs preferably in the form of slide valves. Thus, the adaptation of the entry angles of the primary sifting-air stream and the secondary air stream into their operating and flow spaces which is desirable for good sifting with low power consumption may be attained, as is a simple division of the circulating air quantity into a primary sifting-air stream and a secondary air stream.

The sifter may be provided with cooling-air feeds to the upper part of the sifter housing. This enables cooling of the circulating air stream which is conducted to the separating cyclones, and lowering of the temperature of the fine material in the separating cyclones.

The sifter may also have cooling-air feeds leading into the lower part of the sifter housing. This would also lower the temperature of the sifting air stream in a simple manner.

The spreading disc may be arranged in the sifting space at the height of the circulating-air return line. Thus, a particularly advantageous position of the spreading disc below the secondary-air inflow openings is obtained without the need to deflect the secondary air stream horizontally.

The invention is shown in the drawings, described below, in a preferred embodiment.

Figure 2:
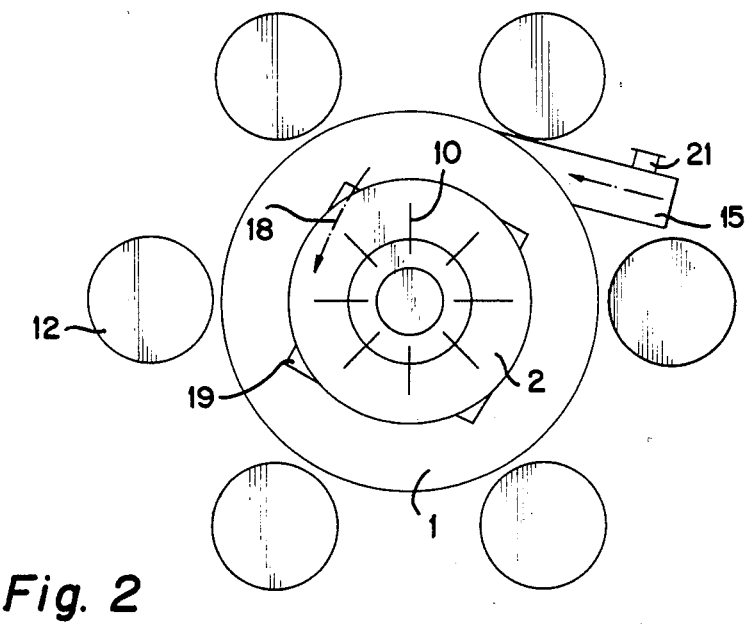
FIG. 2 is a top view of the cyclone circulating-air sifter of FIG. 1.

In FIG. 1 are shown the upper part of the sifter 1, the sifting space 2, and the lower part of the sifter 3 with the coarse-material discharge 4. The charing tube 5 for the charge-in material extends into the sifting space 2 from above. Underneath the charging tube 5 is the spreading disc 6, rotated by the shaft 7 of which is connected to the transmission 8 of the motor 9. The centrifugal system 10 is arranged above the spreading disc 6 and is connected to it. Connecting ducts 11 lead from the upper edge of the sifting space 2 to the cyclone separators 12. A central air outlet tube 13 extends above the cyclone separator 12 and a suction stud 14 is attached to tube 13. The cyclone separators 12 are in communication with a blower which is located outside but not shown, via the suction studs 14 and a connecting line. The input stub 15 for the circulating air is advantageously arranged tangentially at the upper housing part 1. The tangential arrangement of the stub 15 can clearly be seen from FIG. 2. Into the latter, a fresh-air feed stub 21 can open. The individual cyclones 12 are arranged in a circle around the upper part 1 of the sifter.

The centrifugal system 10 includes the blades shown in the drawing. The direction of rotation of the blades of the centrifugal system 10 corresponds to the direction of rotation of the secondary-air stream and the primary sifting-air stream.

The operation of the sifter according to the invention is as follows: the material to be sifted enters through the stub 5 next to the motor 8 into the sifter and is transported through the latter to the spreading disc 6 with the centrifugal system 10. the material to be sifted is distributed uniformly and accelerated centrifugally and gets into the sifting space 2 while dropping down. There, the fine material is fitted-out by the sifting air stream which moves it upward. The coarse fraction of the material sinks down and is discharged from the lower part 3 of the sifter through the coarse material discharge 4. The fine fraction is taken along at first only by the sifting-air stream 16 but then also by the secondary air stream 8 and gets to the separator cyclones 12 through the connection ducts 11. Openings 17 are provided for adjustable guide vanes 20 to direct air from the upper annular part to below the spreading disc 6 as the primary sifting air stream. The tangentially oriented nozzles 19 direct a portion of the air from the upper annular part 1 to the upper part of the control sifting space 2 as the secondary air-stream 18.

The recirculating air, consisting of the primary sifting air 16 and the secondary air 18, leaves the separator cylcones 12 through the central tubes 13, suction studs 14 and is returned to the circulating air input stub 15 via connecting tubes and the outside blower, not shown. The separated fine material particles are discharged from the separator cyclones 12 through fine material discharges as indicated by the arrow pointing downward as the bottom of cyclone separator 12. Fresh air as cooling air may be introduced into the sifter through the fresh air feed stub 21 opening into recirculated air input stub 15. The division into primary sifting air and secondary air permits a good adaptation, in a manner not achieved heretofore, of the sifting-air stream to the prevailing grain sized and other sifting parameters.

The foregoing is a description corresponding, in substance to German application No. P 32 40 793.9, dated Nov. 4, 1982, international priority of which is being claimed for the instant application, and which is hereby made part of this application. Any material discrepancies between the foregoing specification and the specification of the aforementioned corresponding German application are to be resolved in favor of the latter.

I claim:

1. In a method for operating a circulating-air sifter particularly a cyclone circulating-air sifter for sifting cement, wherein the material to be sifted is distributed in a rising sifting air-stream which separates the fine material from the material to be sifted by entraining the fine material in the rising sifting air-stream with the coarse material not entrained by the sifting air-stream precipitating into the sifter and discharged therefrom, wherein the entrained fine material is separated from the air-stream and the air-stream recirculated to the sifter for further sifting of material, the improvement comprising dividing the circulating air-stream into a primary air-stream which is recirculated to the sifter for further sifting of material and a secondary air-stream which branches off from said circulating air-stream before said entrainment of the fine material in the rising sifting air-stream and combines with the primary air after said entrainment of the fine material in the rising sifting air-stream, said primary air-stream combined with said secondary air-stream continuing to rise upwardly and discharging through the sifter, the combined air steam then passing through ducts into external cyclone separators preventing deposition of entrained material in the ducts leading to the external cyclone separators, said primary and secondary air-streams being the only source of circulated air.

2. Method according to claim 1, wherein the primary sifting-air stream and the secondary air stream are fed together into the upper part of the sifter.

3. Method according to claim 2, wherein the primary sifting-air stream is deflected after it is introduced into the upper part of the sifter, and is transferred into the lower part of the sifter.

4. Method according to claim 2, wherein the secondary air stream in passed-on tangentially into the interior of the sifter after it is introduced into the upper part of the sifter.

5. Method according to claim 3, wherein the secondary air stream is passed-on tangentially into the interior of the sifter after it is introduced into the upper part of the sifter.

6. Method according to claim 1, wherein the individual primary air stream and secondary air stream are regulated as to direction of entry and velocity to prevent deposition of material with plugging of lines as well as improving the result of the sifting.

7. Method according to claim 3, wherein the individual primary air stream and secondary air stream are regulated as to direction of entry and velocity to prevent deposition of material with plugging of lines as well as improving the result of the sifting.

8. Method according to claim 4, wherein the individual primary air stream and secondary air stream are regulated as to direction of entry and velocity to prevent deposition of material with plugging of lines as well as improving the result of the sifting.

9. Method according to claim 1, wherein the share of the amount of secondary air in the fed-in amount of circulating air is 5 to 65%.

10. A recirculating-air sifter for sifting material by means of a rising sifting air stream to separate fine material from coarse material comprising a sifter having an upper annular part, a central sifting space, a lower inverted conical part with an opening at the bottom for coarse material discharge, said central sifting space having a centrifugal system with attached blades and a rotating spreading disc, a charing tube open at the top of the sifter for the charge-in of material to be sifted, and leads to the spreading disc which distributes the charge, a plurality of external cyclone separators ring the sifter, connecting ducts for passage of air containing entrained fine material connecting the sifter to the external cyclone separators in which the fine material is separated from the air, a recirculating-air return line which opens into the upper annular part of the sifter for the return of the separated air from the external cyclone separators, two pathflows leading from the returned separated air in the upper annular part of the sifter in which part of the returned separated air flows as a primary air-stream through one said pathflow to the sifter for further sifting of material and the remaining part of the returned separated air branches off through said other pathflow before entrainment of fines in the returned air, and wherein adjustable guide vanes divert the primary air from the upper annular part to below the spreading disc as the sifting-air stream, and wherein tangentially oriented nozzles direct the secondary air from the upper annular part to the upper part of the central sifting space.

11. Sifter according to claim 10, wherein the recirculating-air return line opens tangentially into the upper annular part of the sifter.

12. Sifter according to claim 10, wherein valve means are interposed in the path of the secondary air stream to regulate volume flow of the secondary air.

13. Sifter according to claim 12, wherein the valve means are in the form of slide valves.

14. Sifter according to claim 10, including an inlet to the upper part of the sifter for the introduction of cooling-air.

15. Sifter according to claim 10, including a cooling-air feed into the lower part of the sifter.

16. Sifter according to claim 10, wherein the spreading disc in the sifting space is arranged at the height of the circulating-air return line.

* * * * *